United States Patent [19]

Bradley et al.

[11] 4,315,573

[45] Feb. 16, 1982

[54] METHOD OF STRENGTHENING GLASS CONTAINERS AND ARTICLES SO MADE

[75] Inventors: Ronald W. Bradley; David G. Carl, both of Sylvania; Bernard L. Keating, Toledo, all of Ohio

[73] Assignee: Owens-Illinois, Inc., Toledo, Ohio

[21] Appl. No.: 194,188

[22] Filed: Oct. 6, 1980

[51] Int. Cl.$^3$ .......................... A61J 9/00; A65D 23/08
[52] U.S. Cl. .................................. 215/12 R; 156/85; 156/86; 215/DIG. 6; 427/287; 427/386; 427/389.7; 427/401
[58] Field of Search .................. 427/287, 389.7, 386, 427/401, 266; 156/86, 85; 215/DIG. 6, 12 R

[56] References Cited

U.S. PATENT DOCUMENTS

| | | | |
|---|---|---|---|
| 3,912,100 | 10/1975 | Graham | 215/DIG. 6 |
| 4,048,281 | 9/1977 | Brummett et al. | 156/86 |
| 4,056,208 | 11/1977 | Prejean | 215/DIG. 6 |
| 4,115,599 | 9/1978 | Taylor | 215/DIG. 6 |
| 4,248,030 | 2/1981 | Heckman | 156/86 |

Primary Examiner—Norman Morgenstern
Assistant Examiner—Janyce A. Bell
Attorney, Agent, or Firm—Edward J. Holler; David H. Wilson; Myron E. Click

[57] ABSTRACT

This invention relates to a method of strengthening glass articles and, more specifically, hollow glass containers such as jars for containing foodstuffs. The invention is directed to a method wherein the hollow glass container is surrounded at its heel and bearing surfaces with a thin continuous frangible coating of a polymeric resin such as an epoxy resin. The resin is cured into a frangible thermoset condition to resist thermal shock breakage; however, any breakage of the container at its coated area will result in disruption of the surrounding coating evidencing such breakage. The coating is extremely thin and continuous, and readily applied, and may be used in combination with a foamed thermoplastic tubular sleeve snugly conforming to the body portion of the container. The conforming sleeve serves as a label and to provide an insulating jacket for handling the container when its contents are heated, such as in a microwave oven. The thin coating serves to increase the thermal shock strength of the container and to prevent its thermal shock breakage, but to evidence same when and if such event should occur.

14 Claims, 3 Drawing Figures

U.S. Patent
Feb. 16, 1982
4,315,573
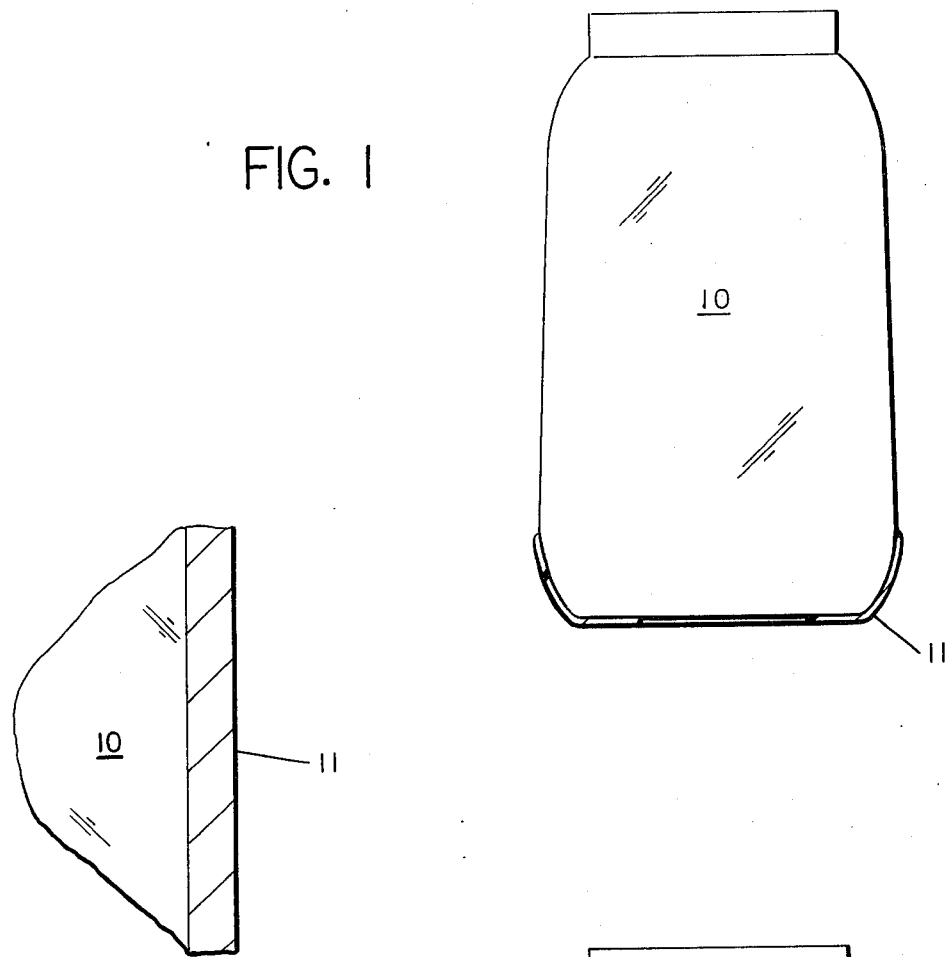
FIG. 1
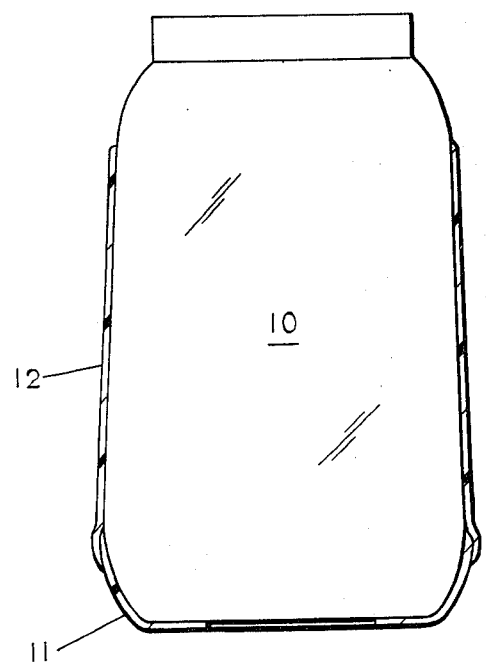
FIG. 2
FIG. 3

METHOD OF STRENGTHENING GLASS CONTAINERS AND ARTICLES SO MADE

BACKGROUND OF THE INVENTION

It is known that the surfaces of glass articles can be strengthened by producing a compressive stress layer at the surface of the article. Chemical tempering has been one common method of achieving such strengthening. Such method creates a positive compressive stress at the surface primarily by a chemical alteration of the surface area of the article. One method involves the exchange of ions at the glass surface by ion exchange reactions such as by the exchange of larger ions, i.e., potassium ions, for smaller sodium ions in the glass. The difficulties and expense of such treatments have prevented their widespread adoption in treating glass articles, except for special purposes.

The prior art has also coated glass bottles, especially those which contain pressurized liquid contents under normal conditions of use. The problems associated with glass breakage have been given extensive attention by researchers in the art with varied results. A common approach to improve glass container strength has been to coat or cover the glass container essentially overall to prevent or minimize its damage in normal conditions of use.

A widely-used commercial coating is a foamed plastic shield or tubular sleeve applied to the sides and a portion of the neck, heel and bearing surfaces of the bottle, frequently leaving the remainder of the bottom uncovered. Such coating appears to exhibit beneficial effects principally as a shock absorber during shipping and handling. Many consumers find such covered bottles to be esthetically appealing where the sleeve or label is capable of being decorated with patterns representing the product normal trade dress and trademarks. While the covering is a plastic film or foam, and thereby relatively soft, it is not easily marred or damaged due to its resiliency and thickness which is normally of the order of about 5 to 20 mils.

Further, many food products are currently being cooked in microwave ovens in the home or in vending areas, frequently in the shipping and delivery container. Presently, food packaged in metal cans must be transferred to other vessels for cooking in microwave ovens. Since foods can be microwave cooked while in glass containers, the need for additional disposable dinnerware or washing of reusable dinnerware is obviated. However, glass containers made of soda-lime glass do not consistently have adequate thermal shock strengths to withstand microwave heating and cooling by the user. The subject coating which is applied only on the bottom or lower portion of the container provides significant increases in thermal shock values.

The use of a thin frangible polymeric coating on the lower part of a jar or bottle not only increases thermal shock strengths, but also permits detection of glass cracks because the coating will also crack due to its brittle nature. Currently used "functional coatings" which are usually soft and distensible are not brittle and may not fracture with the glass. Actually many such coatings are flexible and employed to retain the glass on breakage. In such cases, the food product can leak through the glass crack and be contained by the flexible coating. Such condition could lead to spoilage of the food due to contact with bacteria on the coating. If this condition is not discovered, the spoiled food could be consumed subjecting the consumer to a health hazard.

SUMMARY OF THE INVENTION

Accordingly, it has been found that when glass bottles and jars have their major exterior surfaces protected from severe contact with other like or unlike surfaces by suitable resilient materials, such bottles are stronger and capable of withstanding breakage to a greater degree. While it has been known for some time that impact and thermal shock adversely affect the strength of glass containers, no attempts have been made to specifically produce a commercial glass container whose surfaces are protected from both thermal and physical shock in order to appreciably increase its strength. Normally, the containers are annealed during manufacture to remove or eliminate stresses, and the resilient coating or sleeve serves to minimize or prevent impact damage.

Protection of glass surfaces from thermal shock has been an incidental feature of coatings which have been spray applied to glass articles such as glass containers. These coatings which are frequently polymeric and distensible, such as Surlyn, have been applied for other purposes such as abrasion protection, lubricity or fragment retention. The present invention provides a method of protecting the lower heel and bearing surfaces of the container from thermal shock employing a thin continuous frangible coating. The coating surrounds such surfaces to protect them from breakage upon thermal shock on sudden heating and/or cooling. The coating may consist of a thin layer of cured frangible epoxy resin in thermoset condition which provides resistance to thermal shock. A tubular sleeve or label of foamed thermoplastic material, such as a polystyrene, may be used in addition to the coating to provide a body label for the container for further protection and to facilitate handling.

BRIEF DESCRIPTION OF THE DRAWINGS

FIG. 1 of the drawings consists of a side elevational view partially in vertical section of a wide-mouth glass jar having exterior coating adhered to its lower region in accordance with this invention.

FIG. 2 is an enlarged fragmentary sectional view taken along the line 2—2 of FIG. 1.

FIG. 3 is a view similar to FIG. 1 of the glass container having both the thin coating and a conforming tubular sleeve of thermoplastic material surrounding its body portion.

DESCRIPTION OF THE PREFERRED EMBODIMENT

A wide-mouth glass jar 10, such as those used to package baby food, sauces or soups, is taken as the preferred container. Such container is coated or covered with a thin frangible coating 11 of thermoset material such as epoxy resin applied over its heel and bearing exterior surfaces. In the present case, the bottle or jar is covered with an extremely-thin continuous layer of thermoset material in snugly-fitting configuration over only its heel and bearing surfaces. The material may be a film layer of epoxy resin, such as Product No. G-21510-3N, made and sold by the Armstrong Products Company, Warsaw, Indiana. Such material is normally an opaque white epoxy resin, although it may preferably be used in clear, unpigmented form. The epoxy resin hardener is a tri-metallic anhydride adduct consisting of two of the same tri-mellitic hydride molecules joined at the carboxyl group of each by way of an ester linkage. The epoxy part of the power is a bis-phenyl a-epichlorohydrin. Any of this sort of epoxy could range in equivalent weights of from 50 to 1200. All of the epoxy molecules cross-linked in stoichiometric amounts of 60 to 100 percent can be used. The polymeric frangible coating material is applied to the bottom bearing surface, heel and parting line areas of the glass container having a thickness of about 1 to 5 mils.

The jar 10, as shown in FIG. 1, consists of 2 to 16 ounce short, wide-mouth glass container of the type to contain foods or sauces adapted to heating the contents therein. The container may be used alone with only the heel and bearing coating over its exterior surfaces, or it may be used with a foamed thermoplastic tubular sleeve or jacket 12 over the body portion in addition to the coating. The sleeve may preferably be comprised of a biaxially-oriented, heat-shrinkable sleeve of foam polyethylene or foam polystyrene surrounding the cylindrical side surfaces and the upper portion of the thin coating on the jar lower areas.

In the case of the heat-shrinkable sleeve, it is normally made from a sheet blank having an axial seam or fusion seal with preprinted decoration over its exterior surfaces with a diameter slightly greater than the container body portion. The sleeve is normally applied in tightly conforming, heat-shrunken arrangement so that it has two tightly-fitting annular edges at its upper and lower extremities. The sleeve edges may or may not be sealed to the exterior glass surfaces preferably with a low-melting sealant which is waterproof. The sealant may be applied in the form of annular bands on the bottle or on sleeve prior to application of the tubular sleeve. During or after sleeve application, the sealant bands may be heated to seal the sleeve extremities to the container.

The thin coating of epoxy resin may be applied over the prescribed area of the bare glass container by electrostatic spray application. The stated preferred product is especially formulated for thin-film applications. Using a relatively-low preheat temperature of about 250° F. combined with a standard cure of about 400° F., excellent thin-film coating of the glass container may be obtained by standard fluid bed dipping. The powder may also be applied by commercial electrostatic guns or fluidized beds. Optimum voltage setting will vary with the equipment and container size. Coatings in the range of from about 1 to 5 mils can be obtained. The electrostatic application may be either hot or cold, and a curing schedule of about 450° F. for 3 to 4 minutes is fully adequate for firm, durable adherance of the thin epoxy resin coating.

Twelve sample empty glass jars were bottom sprayed using the aforesaid epoxy resin in powder form, which was then heat cured. The jars were then placed in a steam retort for 1 hour at 250° F. and cooled using standard glass container retort procedures for filled containers. The containers were then subjected to a thermal shock test after heating at full power in a microwave oven. The containers were wrapped with polystyrene film and then immersed in 50° F. tap water which created a 160° F. thermal differential. There were no failures among the test specimen due to glass breakage.

The applied polymeric resin may be cured by any one of various known methods such as by hot air, infrared radiation, ultra-violet radiation, or other known procedures dependent upon the nature of the coating material. Epoxy resin is the preferred material to provide a thin, continuous, frangible coating over the lower heel and bearing surface area of the containers due to its property of rupturing upon breakage of the glass sidewall therebeneath. However, other polymeric resins capable of forming thin, frangible coatings can also be used.

The glass containers can be employed to retain contents with only the thin, frangible bottom and heel coating, or in combination with a foamed thermoplastic sleeve or label covering the major exterior side surfaces of the container. The sleeve may be comprised of foam polystyrene or foam polyethylene or other thermoplastic material. As stated, the sleeve is normally formed from a rectangular sheet blank into a tubular heat-shrinkable sleeve, the material being biaxially-oriented to heat-shrink in two directions. The sleeve is capable of being heat-shrunk in place on the container exterior extending from the upper extremity of the thin coating to the shoulder region of the container, and being fully contiguous and imperforate therebetween. The sleeve normally has an axially-extending fusion seal or seam and a thickness ranging from about 5 to 20 mils. A preferred material consists of foam polystyrene, although foam polyethylene or a thermoplastic film, such as polyvinylchloride, may also be used. The sleeve may also be formed of a foam/film laminate of polystyrene, the film layer being exterior to provide improved decorating effects. If desired, the upper and lower annular edges of the sleeve may be coated with a hot melt adhesive to prevent water and water vapor from contacting the glass surfaces therebeneath. Such water contact can adversely affect such surfaces as indicated by internal pressure strength tests.

The foam thermoplastic sleeve serves both a labeling function and an insulating jacket to permit handling the container when it and its contents are hot. The jar having both heel coating and insulating sleeve is able to withstand heating of the jar contents in a microwave oven, for example, and subsequent rapid cooling such as by tap water, without breakage of the container. In the event that glass breakage does occur, the adhered frangible coating at the lower region will also rupture indicating glass breakage and possible contamination of the contents.

Tests were conducted on filled 8 ounce baby food jars which were both coated in the prescribed area, and uncoated. Of the 27 uncoated samples, 14 were found to experience at least some breakage on being subjected to a thermal shock differential tests varying from 120° F. to 160° F., with most breakage occurring at about 140° F. differential. Of the 24 coated samples, all were found to pass the 160° F. thermal differential shock test without breakage.

Tests were conducted on filled 15½ ounce spaghetti sauce jars which were both coated in the prescribed area, and uncoated. Of the 32 uncoated samples, 9 were found to experience at least some breakage on being subjected to a thermal shock differential test varying from 120° F. to 160° F. Of the 24 coated samples, all were found to pass the 160° F. thermal differential shock test without breakage.

The labeled containers exhibit sufficient thermal shock strength to permit microwave heating of the food product in the glass container without risking thermal shock breakage, or without having to transfer the food to another container for heating. This eliminates the cost of disposable containers and the washing of non-disposable dinnerware.

Although the exact mechanism by which this coating works is not proven, it appears to simply act as a thermal insulator. By protecting the glass sidewall at the coated area from sudden temperature changes, the thermal stresses required for breakage to occur do not develop.

Various modifications of the present invention may be resorted to within the spirit and scope of the appended claims.

We claim:

1. The method of increasing the effective strength of a soda-lime glass container for its use in heating contents comprising the step of surrounding the heel and bearing surfaces of said glass container with a thin imperforate frangible coating of a thermoset polymeric resin having a thickness ranging from about 1 to 5 mils said coating making said container thermal shock-resistant and being non-fragment retentive upon breakage of said container.

2. The method in accordance with claim 1, including the step of curing the said thin imperforate coating of resin into heat-resistant durable condition.

3. The method in accordance with claim 1, including the step of covering the major exterior side surfaces of said glass container above said thin imperforate coating with a thermoplastic tubular sleeve adapted to conform snugly to said major exterior side surfaces.

4. The method in accordance with claim 3, wherein the said thermoplastic tubular sleeve comprises foam polyethylene.

5. The method in accordance with claim 3, wherein the said thermoplastic tubular sleeve comprises foam polystyrene.

6. The method of increasing the effective thermal shock strength of a soda-lime glass container for its use in heating contents comprising the steps of applying a thin imperforate frangible polymeric coating of epoxy resin in cured thermoset condition to at least the heel and bearing surfaces of said glass container, said coating having a thickness ranging from about 1 to 5 mils and being non-fragment retentive upon breakage of said container.

7. The method in accordance with claim 6, including the step of applying a foamed thermoplastic tubular sleeve over the major exterior side surfaces of said glass container above said frangible polymeric coating and heat shrinking said tubular sleeve in place to snugly conform to said exterior said surfaces.

8. The method in accordance with claim 7, wherein said foamed thermoplastic tubular sleeve comprises a heat-shrinkable biaxially-oriented tube of foam polystyrene having an axially-extending fusion seam.

9. A thermal shock-resistant soda-lime glass container adapted to heating contents therein comprising a hollow glass container having a wide-mouth and generally-cylindrical sidewalls and a thin imperforate frangible coating of a thermoset polymeric over at least the heel and bearing surfaces of said glass container, said coating having a thickness ranging from about 1 to 5 mils said coating being rupturable and substantially non-fragment retentive upon breakage of said container.

10. A thermal shock-resistant soda-lime glass container adapted to heating contents therein comprising a hollow glass container having a wide-mouth and generally-cylindrical sidewalls and a thin imperforate frangible coating of an epoxy resin over at least the heel and bearing surfaces of said glass container, said coating having a thickness ranging from about 1 to 5 mils said coating being essentially non-fragment retentive upon breakage of said container.

11. The thermal shock-resistant soda-lime glass container in accordance with claim 10, wherein the cylindrical sidewalls of said glass container are covered with a snugly-conforming tubular sleeve of foamed heat-shrinkable biaxially-oriented thermoplastic material having a thickness ranging from about 5 to 20 mils.

12. The thermal shock-resistant soda-lime glass container in accordance with claim 11, wherein said sleeve of foamed thermoplastic material comprises polystyrene.

13. The thermal shock-resistant soda-lime glass container in accordance with claim 11, wherein said sleeve of foamed thermoplastic material comprises polyethylene.

14. The thermal shock-resistant soda-lime glass container in accordance with claim 11, wherein said sleeve of foamed thermoplastic material comprises a co-extruded film-foam laminate of polystyrene.

* * * * *